(12) United States Patent
Luciani, Jr. et al.

(10) Patent No.: US 7,447,995 B2
(45) Date of Patent: Nov. 4, 2008

(54) SYSTEM AND METHOD FOR CURSOR CALIBRATION

(75) Inventors: Luis E. Luciani, Jr., Tomball, TX (US); Sanjeev Singh, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 961 days.

(21) Appl. No.: 10/186,114

(22) Filed: Jun. 28, 2002

(65) Prior Publication Data
US 2004/0001044 A1 Jan. 1, 2004

(51) Int. Cl.
*G06F 3/00* (2006.01)
(52) U.S. Cl. .................. 715/740; 715/741; 715/742; 715/437

(58) Field of Classification Search .................. 345/740, 345/742, 744, 746, 761, 771, 778, 856, 858
See application file for complete search history.

(56) References Cited

U.S. PATENT DOCUMENTS 6,219,027 B1 * 4/2001 Shimizu et al. ............. 345/733
6,710,790 B1 * 3/2004 Fagioli ....................... 345/802

* cited by examiner

*Primary Examiner*—Simon Ke

(57) ABSTRACT

A system for controlling a cursor is provided. The system includes a monitored system that generates user interface data and mouse position data, such as would be provided in a monitor window. A remote monitoring system receives the user interface data and mouse control data, such as for controlling the location of a cursor in a local window and a monitor window. A mouse synchronization system receives the user interface data and the mouse control data and generates mouse calibration data based on the user interface data and the mouse control data, such as by determining the actual movement of the mouse using video data and determining a correction factor related to the estimated location of the mouse, based on mouse control data.

22 Claims, 4 Drawing Sheets

SYSTEM AND METHOD FOR CURSOR CALIBRATION

CROSS-REFERENCE TO RELATED APPLICATIONS

Not applicable.

STATEMENTS REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

The present invention relates generally to mouse cursor calibration and more specifically to a system and method for remote monitor cursor calibration that allows switching between the local mouse cursor and the remote mouse cursor to be accomplished transparently.

2. Description of the Related Art

In remote monitoring systems, the remote system mouse can be in one of two modes: software mode or hardware mode. In hardware mouse mode, the mouse cursor position can be exactly determined from the video controller and this data can be transmitted to the monitoring station. On the monitoring station, this mouse cursor position data can be used to exactly synchronize the local and remote mouse cursors. In software mouse mode, the mouse cursor position can not be determined without installing additional software on the monitored station and hence without this additional overhead, there is no way to tell the monitoring station about the current mouse cursor position. Based on the initial divergence of the mouse position, the local and remote mouse cursors get out of synchronization and it is difficult and frustrating to control the mouse cursor movement, especially around the edges of the remote window.

SUMMARY OF THE INVENTION

In accordance with the present invention, a system and method for cursor calibration are provided that overcome known problems with cursor calibration.

In particular, a system and method for cursor calibration are disclosed that use video data to determine the mouse position when the cursor is in the software mouse mode.

In accordance with an exemplary embodiment of the present invention, a system for controlling a cursor is provided. The system includes a monitored system that generates user interface data, such as would be provided in a monitor window. A remote monitoring system receives the user interface data and mouse control data, such as for controlling the location of a cursor in a local window and a monitor window. A mouse synchronization system receives the user interface data and the mouse control data and generates mouse calibration data based on the user interface data and the mouse control data, such as by determining the actual movement of the mouse using video data and determining the estimated location of the mouse, based on mouse control data.

The present invention provides many important technical advantages. One important technical advantage is a system for calibrating a mouse controller that determines the mouse position based on the video data. The determination of the mouse position allows the location of the cursor in the remote monitor window to be determined so as to prevent discontinuous movement of the cursor when transitioning between the local window and the remote monitor window.

Those skilled in the art will further appreciate the advantages and superior features of the invention together with other important aspects thereof on reading the detailed description that follows in conjunction with the drawings.

DETAILED DESCRIPTION OF THE INVENTION

Figure 1:
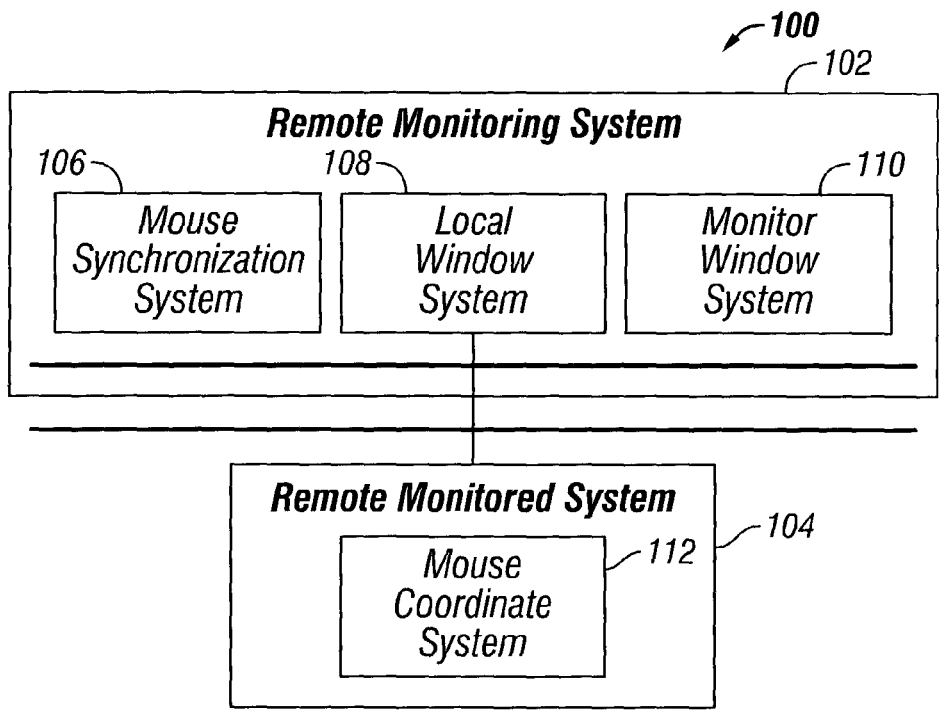
FIG. 1 is a diagram of a system for cursor calibration in accordance with an exemplary embodiment of the present invention.

In the description that follows, like parts are marked throughout the specification and drawings with the same reference numerals, respectively. The drawing figures might not be to scale and certain components can be shown in generalized or schematic form and identified by commercial designations in the interest of clarity and conciseness.

FIG. 1 is a diagram of a system 100 for cursor calibration in accordance with an exemplary embodiment of the present invention. System 100 allows the location of a cursor within a monitor window to be determined so that the transition of the cursor from the monitor window to a local window is continuous.

System 100 includes remote monitoring system 102 and remote monitored system 104, each of which can be implemented in hardware, software, or a suitable combination of hardware and software, and which can be one or more hardware systems, or one or more software systems operating on a general purpose processing platform. As used herein, a hardware system can include discrete semiconductor devices, an application-specific integrated circuit, a field programmable gate array or other suitable devices. A software system can include one or more objects, agents, threads, lines of code, subroutines, separate software applications, user-readable (source) code, machine-readable (object) code, two or more lines of code in two or more corresponding software applications, databases, or other suitable software structures. In one exemplary embodiment, a software system can include one or more lines of code in a general purpose software application, such as an operating system, and one or more lines of software in a specific purpose software application.

Remote monitoring system 102 is coupled to remote monitored system 104. As used herein, the term "couple" and its cognate terms, such as "couples" and "coupled," can include a physical connection (such as a fiber optic conductor), a virtual connection (such as through randomly assigned memory locations of a data memory device), a logical connection (such as through logical gates of a semiconducting device), other suitable connections, or a suitable combination of such connections. In one exemplary embodiment, systems and components are coupled to other systems and components through intervening systems and components, such as through an operating system of a processing platform. Remote monitoring system 102 allows an operator to control one or more software applications operating on remote monitored system 104. In one exemplary embodiment, remote monitoring system 102 can be used to provide technical assistance to a user at remote monitored system 104. In another exemplary embodiment, remote monitored system 104 can be an unmanned system such as a server or other suitable systems. Likewise, other suitable implementations can be used.

Remote monitoring system 102 includes mouse synchronization system 106, local window system 108, and monitor window system 110, each of which can be implemented in hardware, software, or a suitable combination of hardware and software, and which can be one or more hardware systems, or one or more software systems operating on a general purpose processing platform. Local window system 108 provides a local window for applications operating on the hardware platform associated with remote monitoring system 102. Likewise, monitor window system 110 generates a monitor window within the local window generated by local window system 108, so that an operator at remote monitoring system 102 can access and control applications operating on remote monitored system 104.

Remote monitored system 104 includes mouse coordinate system 112, which can be implemented in hardware, software, or a suitable combination of hardware and software, and which can be one or more hardware systems, or one or more software systems operating on a general purpose processing platform. Mouse coordinate system 112 is used to keep track of the mouse position when the mouse is being operated in software mouse mode.

In the process of switching between the local window generated by local window system 108 and the monitor window generated by monitor window system 110, a user of remote monitoring system 102 can move a mouse to cause a cursor to move from the local window to the monitor window. When the cursor is moved into the remote monitor window and the remote system is running in software mouse mode, the mouse synchronization system can be used to control the cursor position as a function of mouse control data received from the remote system. For example, when a mouse is moved, it can generate X and Y movement control data that is translated into cursor control data. In a software mouse mode, remote mouse coordinate system 112 can keep track of the mouse position if a video adapter or other hardware device is not available to access and determine the cursor data. The present invention uses mouse synchronization system 106 and mouse coordinate system 112 to calibrate the cursor location so as to ensure correlation between the cursor location as determined by the mouse synchronization systems, so as to ensure continuity when the cursor transitions between monitor window system 110 to local window system 108.

Mouse synchronization system 106 receives cursor data from mouse coordinate system 112 of remote monitored system 104. Mouse synchronization system 106 also receives mouse control data, such as the X axis and Y axis movement data generated by the mouse on remote monitoring system 102. Mouse synchronization system 106 then determines the correlation factor between movement of the cursor within the remote monitor window and the X axis and Y axis control data generated by the mouse on remote monitoring system 102. In this manner, mouse synchronization system 106 can determine a correction factor to be applied that allows the cursor location to be calibrated. Thus, when the cursor is moved towards the edge of the remote monitor window, the proximity of the cursor to the local window can be precisely established so that transition of the cursor from the remote monitor window to the local window (i.e. a remote monitor window to a local window) can be smoothly performed, such that the transition is transparent to the user.

In operation, remote monitoring system 102 generates a local window when local window system 108 is activated and a monitor window when monitor window system 110 is activated so as to allow remote monitored system 104 to be controlled. Mouse synchronization system 106 is used to generate the remote mouse position data from the mouse data received from the remote mouse coordinate system 112 so that cursor movement within the monitor window can be calibrated to the cursor location on the local window. In this manner, continual monitoring of the cursor location and approximation of edges of the monitor window is not needed, and the movement of the cursor across the remote monitor window and local window appears smooth and continuous to the user.

Figure 2:
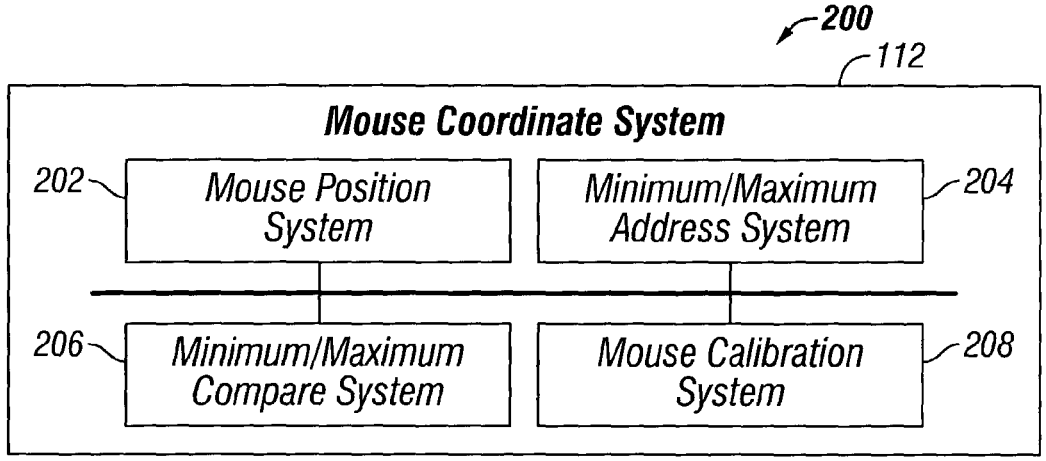
FIG. 2 is a diagram of a system for providing mouse synchronization in accordance with an exemplary embodiment of the present invention.

FIG. 2 is a diagram of a system 200 for providing mouse synchronization in accordance with an exemplary embodiment of the present invention. System 200 includes mouse coordinate system 112 and mouse position system 202, minimum/maximum address system 204, min/max compare system 206, and mouse calibration system 208, each of which can be implemented in hardware, software, or a suitable combination of hardware and software, and which can be one or more hardware systems or one or more software systems operating on a general purpose processing platform.

Mouse position system 202 receives mouse control data from a mouse controller and translates the mouse control data into cursor coordinate data. In one exemplary embodiment, mouse position system 202 can receive binary data generated by a mouse controller indicating relative X and Y axis displacement, and can translate the data into cursor coordinate data. Mouse position system 202 can include a software cursor controller, a hardware cursor controller, or additional or other suitable systems and components.

Minimum/maximum address system 204 receives video frame buffer data and determines the minimum and maximum location of a change in the video frame buffer data. In one exemplary embodiment, minimum/maximum address system 204 can receive PCI bus data that includes video adapter video frame buffer data, and can detect writes to the video adapter video frame buffer. Minimum/maximum address system 204 then generates minimum and maximum address data based on the video adapter's video frame buffer data or other suitable data.

Min/max compare system 206 determines whether the minimum and maximum address data generated by minimum/maximum address system 204 is lower than or higher than the previous minimum or maximum address data. If the subsequent minimum and maximum address data is lower or greater than the previous, min/max compare system 206 stores the new value so as to maintain a minimum and maximum range measurement. Likewise, min/max compare system 206 can store historical data, vector data, or other suitable data.

Mouse calibration system 208 receives the minimum and maximum range data and mouse coordinate data and determines whether the change in minimum or maximum coordinate data corresponds to a mouse movement. If the change in minimum or maximum coordinate data corresponds to a mouse movement, mouse calibration system 208 generates mouse movement indicator data and transmits the mouse movement indicator data to mouse position system 202, which determines the mouse position based on the video data received from min/max address system 204. In this manner, the location of the cursor in the remote monitor window can be accurately determined, such that transfers between local and remote mouse windows can be smoothly accomplished.

In operation, system 200 allows mouse calibration to be provided so as to allow smooth cursor movement between a local and remote monitor window. System 200 allows the cursor location to be precisely known so as to allow transparent continuity for movement of the cursor between the local and remote screens.

Figure 3:
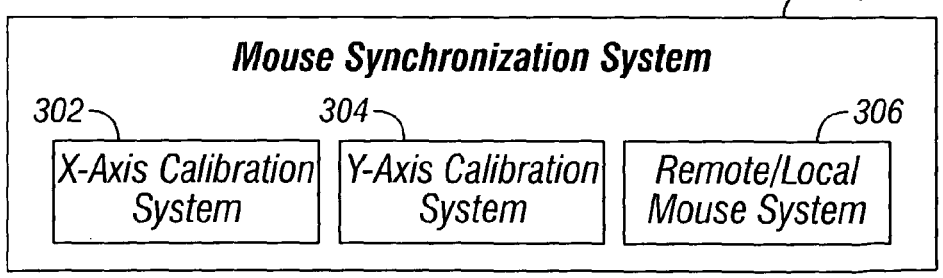
FIG. 3 is a diagram of a system for mouse calibration in accordance with an exemplary embodiment of the present invention.

FIG. 3 is a diagram of a system 300 for mouse synchronization in accordance with an exemplary embodiment of the present invention. System 300 includes mouse synchronization system 106, X axis calibration system 302, Y axis calibration system 304, and remote/local mouse system 306, each of which can be implemented in hardware, software, or a suitable combination of hardware and software, which can be one or more software systems operating on a general purpose processing platform.

X axis calibration system 302 receives mouse control data for an X axis controller on remote monitoring system 102 and X axis mouse position from remote monitored system 104 based on minimum and maximum video address data for the X axis. X axis calibration system 302 then generates an X axis calibration factor for controlling cursor location in a remote monitor window. X axis calibration system 302 can then apply the X axis calibration factor to subsequent mouse control data. In this manner, the location of the cursor can be calibrated and verified as needed. Thus, continuous tracking of cursor location is not required.

Y axis calibration system 304 receives mouse control data for a Y axis controller on remote monitoring system 102 and the Y axis mouse position from remote monitored system 104 based on the minimum and maximum video address data for the Y axis. Y axis calibration system 304 then generates a Y axis calibration factor for controlling cursor location in a remote monitor window. Y axis calibration system 304 can then apply the Y axis calibration factor to subsequent mouse control data. In this manner, the location of the cursor can be calibrated and verified as needed. Thus, continuous tracking of cursor location is not required.

Remote/local mouse system 306 receives control data from mouse calibration system 208 and passes control of the cursor from a local mouse controller to a remote mouse controller when the cursor moves from a local screen to a remote monitor screen, and from a remote mouse controller to a local mouse controller when the cursor moves from the remote monitor screen to the local screen. In one exemplary embodiment, remote/local mouse system 306 can include buffer data that is used to cause a local mouse controller to be disabled and a remote mouse controller to be enabled, to allow a remote mouse controller to be enabled and a local mouse controller to be disabled, or for other suitable processes to be performed.

In operation, system 300 allows a calibration factor for controlling the location of a cursor in a remote monitor window to be generated and applied. In this manner, the cursor can be moved continuously from a local window to a remote monitor window and back to the local window without jumping, leaving the remote monitor window early, or experiencing other problems that cause user frustration.

Figure 4:
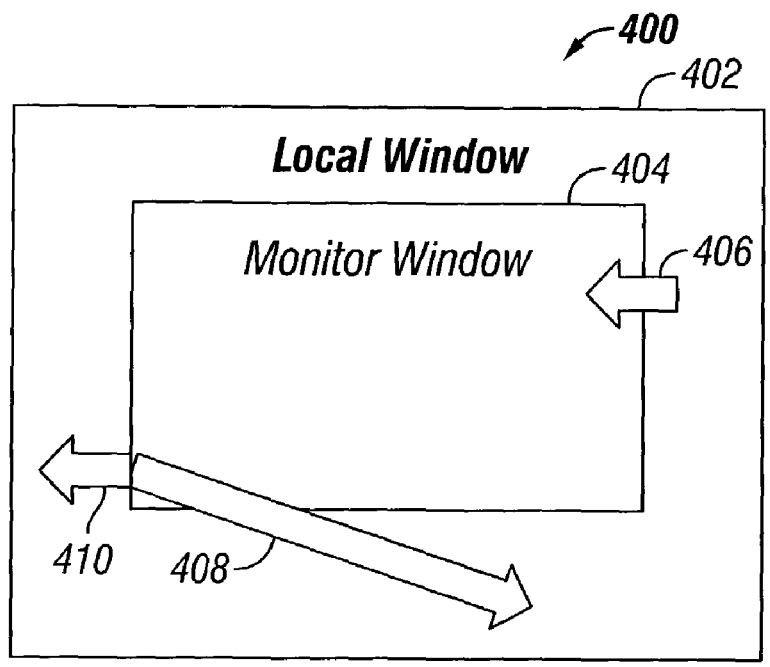
FIG. 4 is a diagram of a window demonstrating exemplary concepts of the present invention.

FIG. 4 is a diagram of a window 400 demonstrating exemplary concepts of the present invention. Window 400 includes local window 402 and monitor window 404. Furthermore, in this exemplary embodiment arrow 406 shows the direction of a cursor moving from local window 402 into monitor window 404. As the cursor leaves local window 402, it switches to the remote window, where the mouse coordinate data from the remote system is used to control the location of cursor within monitor window 404. The mouse synchronization system receives mouse control data and generates movement control data for the location of the cursor within monitor window 404.

When the cursor is moved from monitor window 404 to local window 402 though, it is possible that the cursor location will not continuously translate from monitor window 404 to local window 402. For example, arrow 408 shows one exemplary problem with existing systems in which the cursor can be moved in a direction towards an edge, shown by the rear portion of arrow 408 at the interface between monitor window 404 and local window 402, but when the cursor is moved into local window 402, the cursor will jump to a different location, such as to the head of the arrow 408. Thus, if an operator is controlling the location of a cursor and is trying to move the cursor from monitor window 404 to local window 402 to accomplish a purpose, the operator will need to stop and reorient the location of the cursor. The present invention avoids such problems by calibrating the location of the cursor within the monitor window 404 using cursor calibration data. When cursor calibration data is applied to the mouse control data to provide an accurate location of the cursor within monitor window 404, then movement of the cursor out of monitor window 404 into local window 402 is accomplished in the manner shown by arrow 410, where the cursor moves continuously in the direction shown without any apparent gaps. In this manner, the transfer of the cursor control from a software controller to a hardware controller is transparent to the user.

Figure 5:
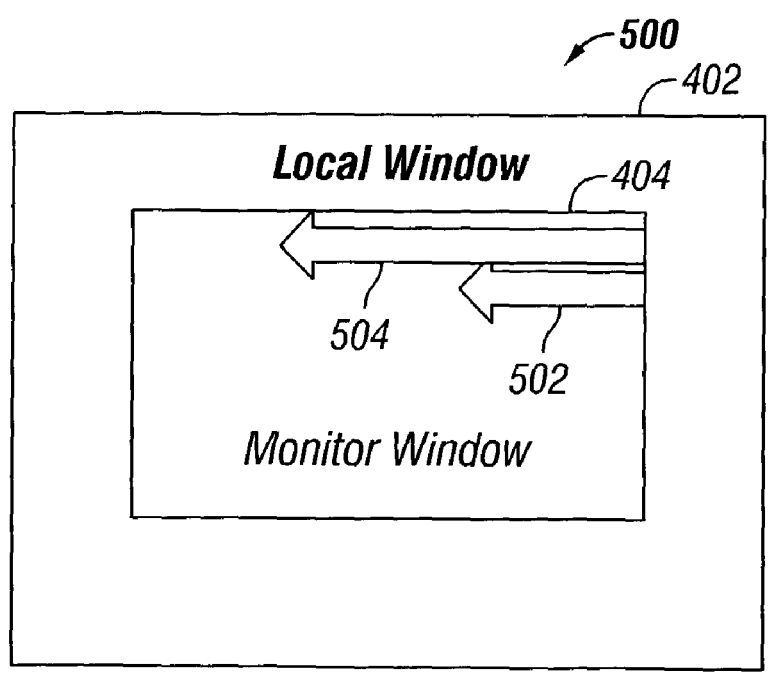
FIG. 5 is a diagram of a window showing exemplary concepts of the present invention.

FIG. 5 is a diagram of a window 500 showing exemplary concepts of the present invention. Window 500 includes local window 402 and monitor window 404, and exemplary estimated cursor location 502 and actual cursor location 504. Cursor location 502 correlates to the software mouse controller estimated cursor location based on mouse control data. Likewise, actual cursor location 504 shows the actual cursor movement through monitor window 404. By measuring the minimum and maximum address for changes in the video data on a frame-by-frame basis, it can be determined that the minimum address is decreasing in the direction shown by arrow 504. Likewise, based on mouse control data it can be determined that the cursor is moving in the direction of arrow 502. By determining the ratio between arrow 504 and 502, a calibration factor can be determined that is used to correct the movement of the cursor within monitor window 404. In this manner, an accurate estimate can be determined of the location of the cursor within monitor window 404, such that when the cursor is moved towards the edge of monitor window 404 and local window 402, the accurate cursor location data can be used to make decisions on switching between the local mouse cursor and remote mouse cursor.

Figure 6:
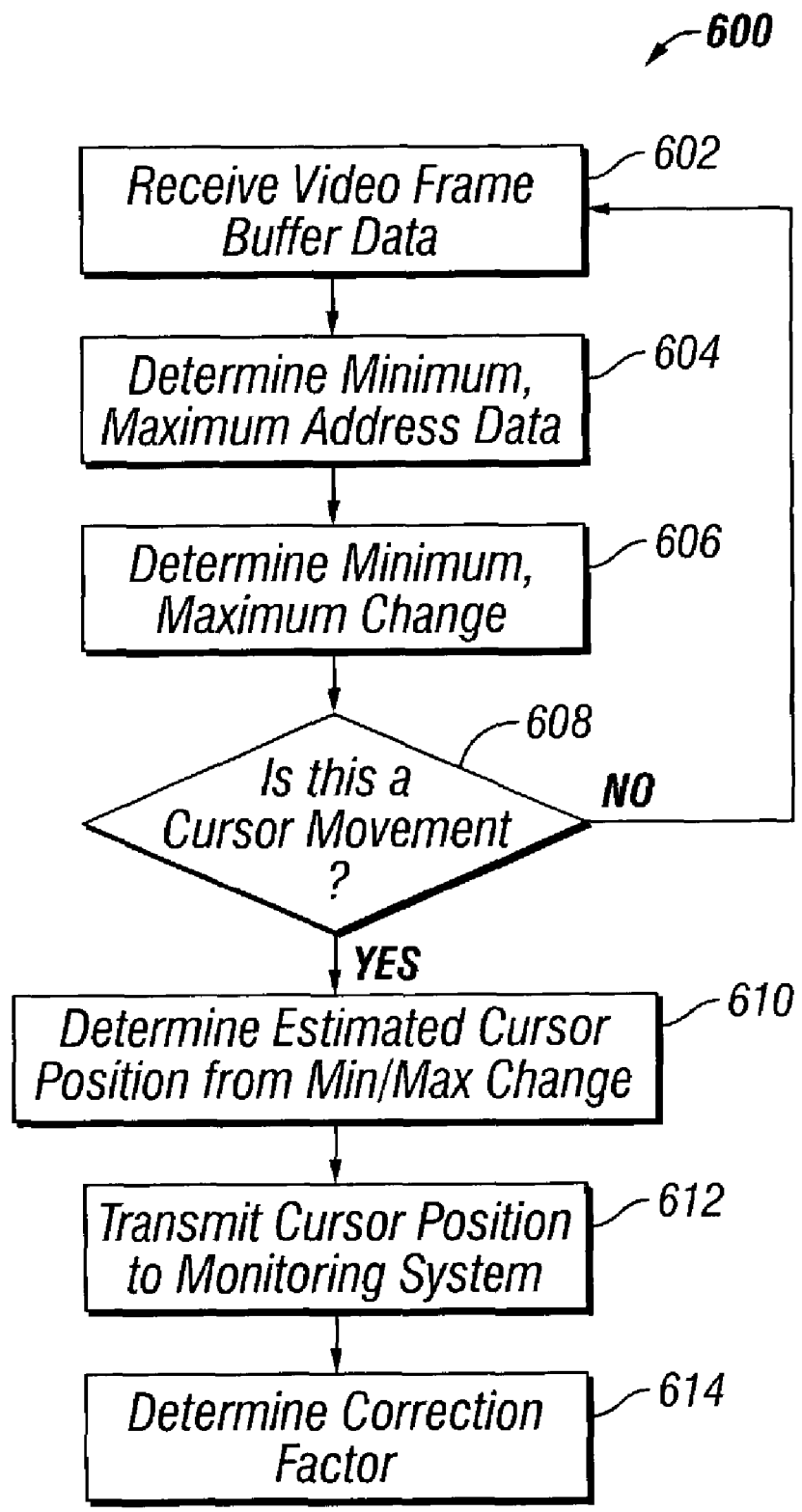
FIG. 6 is a flow chart of a method for controlling the location of a cursor in accordance with an exemplary embodiment of the present invention.

FIG. 6 is a flow chart of a method 600 for controlling the location of a cursor in accordance with an exemplary embodiment of the present invention. Method 600 allows a cursor position to be determined on the monitored system when the mouse is in software mouse mode and the cursor position to be then transmitted to the monitoring station.

Method 600 begins at 602 where video frame buffer data is received. In one exemplary embodiment, the video buffer frame data can be received over a PCI bus, and can show the minimum and maximum location of change in the frame buffer. The method then proceeds to 604 where the minimum and maximum address data for such changes is determined. In one exemplary embodiment, the address data can be determined by measuring changes in pixel brightness or other suitable processes. The method then proceeds to 606.

At 606, the change in the minimum and maximum address data is determined. In one exemplary embodiment, the change in minimum and maximum address data can be determined by comparing the current minimum and maximum address data to previous minimum and maximum address data so as to determine a direction of movement in the minimum and maximum address data. The method then proceeds to 608.

At 608, it is determined whether the change in video data corresponds to a mouse cursor movement. In one exemplary embodiment, the change in minimum and maximum address data can be used to determine whether the change in video data corresponds to mouse cursor movement, such as whether the change in minimum and maximum address data corresponds to a direction of mouse cursor movement. If it is determined that the change in video data corresponds to a mouse cursor movement, the method proceeds to 610. Otherwise, the method returns to 602.

At 610, the estimated mouse cursor position is determined based on the minimum and maximum address change. The method then proceeds to 612. At 612, the mouse cursor position is transmitted to the remote monitoring station, which can use the cursor position to synchronize the local and remote cursors. The method then proceeds to 614 where one or more correction factors are determined for calibration of the cursor. These correction factors can be determined at the monitored system, the monitoring system, or at other suitable locations.

In operation, method 600 allows a cursor location to determined when the monitored station is in software mouse mode so as to ensure continuity between the location of the cursor as it moves from the local window to the remote monitor window and back on the monitoring station. Method 600 thus allows the cursor location to be calibrated to ensure that the cursor location changes continuously instead of large jumps or in other manner that would cause aggravation or frustration to a user.

Figure 7:
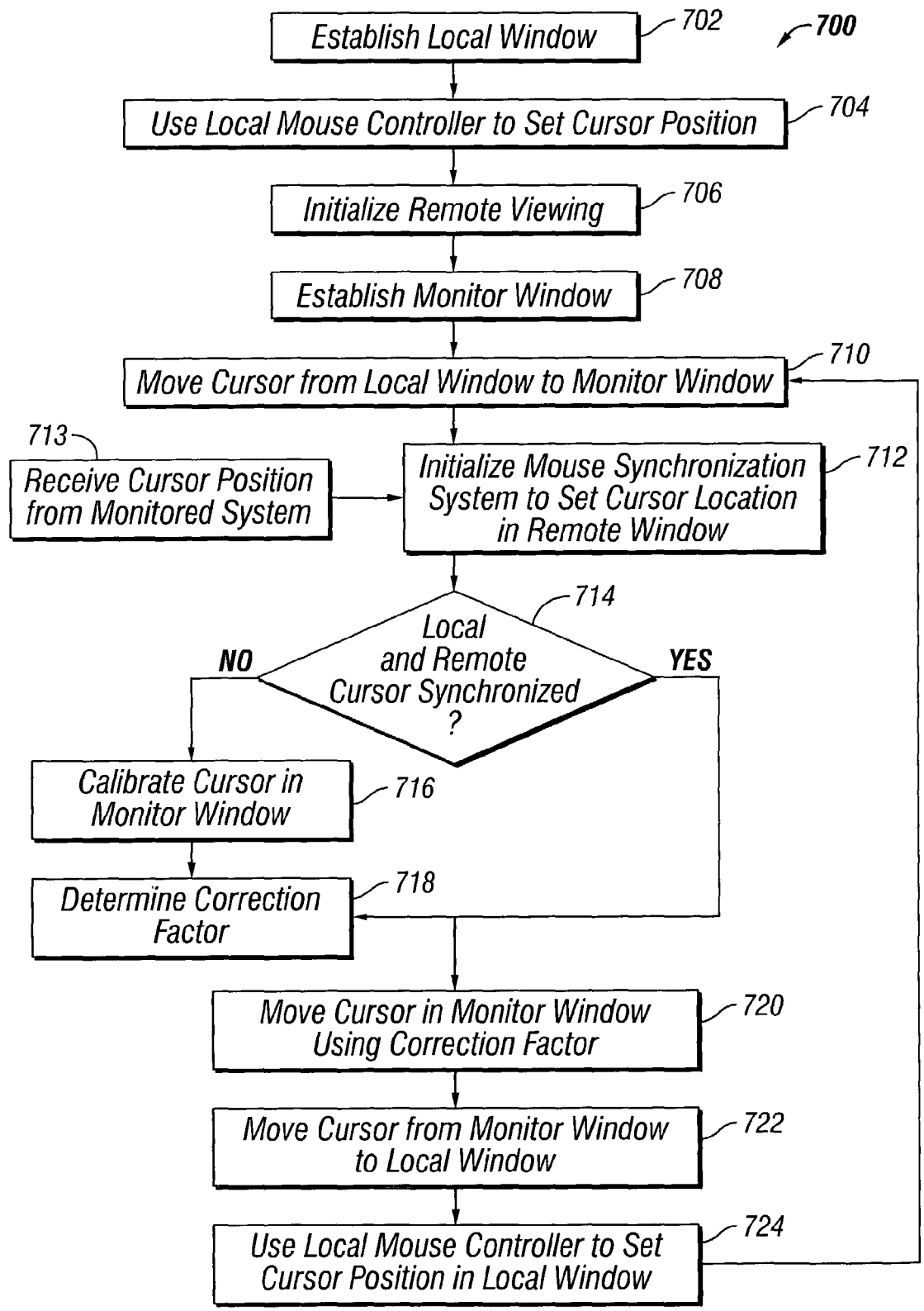
FIG. 7 is a flow chart of a method for controlling a cursor in accordance with an exemplary embodiment of the present invention.

FIG. 7 is a flow chart of a method 700 for controlling a cursor in accordance with an exemplary embodiment of the present invention. Method 700 begins at 702 where a local window is established. In one exemplary embodiment, the local window can include an application window, an operating system window, or other suitable windows. The method then proceeds to 704.

At 704, a local mouse controller is initialized to set the cursor location. In one exemplary embodiment, a local mouse cursor location system can be used that determines the cursor location based on mouse initialization data, mouse control data, or other suitable data. The method then proceeds to 706.

At 706, remote viewing is initialized. The remote viewing can be initialized by executing an application on a monitor platform, by executing an application on a monitored application platform, or in other suitable manners. The method then proceeds to 708.

At 708, a monitor window is established. In one exemplary embodiment, data received from the monitored application can be used to generate a graphic user interface at the local device. The method then proceeds to 710.

At 710 a cursor is moved from the local window to the monitor window, such as by moving a mouse that controls the location of the cursor. As the cursor moves from the local window to the monitor window, control data is generated to indicate that a switch can be made between a local mouse controller to a remote mouse controller, or other suitable processes can be performed. The method then proceeds to 712.

At 712, a mouse synchronization system is initialized to set up the cursor location in the remote window. In one exemplary embodiment, the mouse synchronization system can receive cursor location data from the remote mouse controller at 713 and can translate that location to a location in the remote monitor screen, such as based on other remote monitor screen location data or other suitable data. The method then proceeds to 714.

At 714, it is determined whether the remote and local mouse cursor positions are synchronized. If the cursor positions are synchronized, the method proceeds to 720. Otherwise, the method proceeds to 716 where the cursor is calibrated in the monitor window. In one exemplary embodiment, the cursor can be calibrated in the monitor window by monitoring mouse position data from the monitored system, or other suitable information. The method then proceeds to 718 where a correction factor is determined. The correction factor can include a simple ratio between measured and estimated mouse movement data, or other suitable data. The method then proceeds to 720.

At 720, the cursor is moved in the monitor window using the correction factor. For example, when the mouse control data is generated, the cursor movement data can be determined by multiplying the mouse control data by the correction factor. This cursor movement data can be used to determine the location of the cursor within the local window, for when the cursor control is transferred back to the local mouse controller. Other suitable processes can be used. The method then proceeds to 722.

At 722, the cursor is moved from a monitor window to a local window. For example, the cursor could be moved in a vector direction from within the monitor window towards the edge of the monitor window, such that the cursor will enter the local window upon leaving the monitor window. The method then proceeds to 724 where the local mouse controller is initialized for continuous control of the cursor. In one exemplary embodiment, the use of the calibration factor can provide increased accuracy on the estimated location of the cursor, such that when it is determined that the cursor is approaching a local window edge to a remote window, the local and remote controller can be turned on and off in an appropriate sequence so as to result in a continuous movement of the cursor from the remote monitor window to the local window.

In operation, method 700 allows a cursor to be moved from a local window to a remote monitor window and back to the local window in a manner that ensures continuity in cursor location. Method 700 thus allows a cursor to be controlled by using a calibration factor or other suitable processes so that sudden changes in cursor location as the cursor is moved from the local window to the monitor window and back does not occur.

In view of the above detailed description of the present invention and associated drawings, other modifications and variations will now become apparent to those skilled in the art. It should also be apparent that such other modifications and variations may be effected without departing from the spirit and scope of the present invention.

We claim:

1. A system for cursor calibration comprising:
   a monitored system generating user interface data and cursor control data;
   a remote monitoring system receiving the user interface data and cursor control data; and
   a mouse coordinate system receiving the user interface data and the cursor control data and generating cursor calibration data based on the user interface data and the cursor control data,
   wherein the remote monitoring system further comprises a local window and a monitor window within the local window, and the cursor calibration data is used to ensure continuity between the cursor location in the local window and the cursor location in the monitor window.

2. The system of claim 1 wherein the mouse coordinate system further comprises a mouse position system receiving video control data and generating cursor control data.

3. The system of claim 1 wherein the mouse coordinate system further comprises a minimum/maximum address system receiving video buffer data and generating minimum and maximum location data corresponding to a change in a frame of the video buffer data.

4. The system of claim 1 wherein the mouse coordinate system further comprises a min/max compare system receiving minimum and maximum location data and determining whether a change in the minimum and maximum location data corresponds to a mouse cursor movement.

5. The system of claim 1 further comprising a mouse synchronization system receiving the mouse cursor position data and mouse control data and generating calibration correction data.

6. The system of claim 5 wherein the mouse synchronization system further comprises a remote/local mouse system receiving cursor coordinate data and switching between a local cursor controller and a remote cursor controller.

7. The system of claim 1, wherein the monitor window displays information of software operating in the monitored system, and the local window displays information of software operating in the remote monitoring system, the monitored system being separate from the remote monitoring system.

8. A method for controlling a cursor comprising:
   generating a monitor window for a remote monitored system within a local window;
   moving a cursor from the local window into the monitor window;
   determining a calibration factor for the cursor; and
   applying the calibration factor to mouse control data so as to maintain continuity when the cursor is moved from the monitor window to the local window.

9. The method of claim 8 wherein determining the calibration factor for the cursor comprises determining the calibration factor by using a change in the monitor window data.

10. The method of claim 9 wherein determining the calibration factor for the cursor further comprises comparing the change in the monitor window data to mouse control data to determine a calibration multiplier.

11. The method of claim 9 wherein moving the cursor from the local window into the monitor window further comprises switching from a local cursor controller to a remote cursor controller.

12. The method of claim 8 wherein applying the calibration factor to the mouse control data so as to maintain continuity when the cursor is moved from the monitor window to the local window comprises determining the location of the cursor in the monitor window using the calibration factor.

13. The method of claim 8 further comprising moving the cursor from the monitor window to the local window in a manner that appears continuous to a user.

14. The method of claim 8 further comprising turning off a remote cursor controller when the cursor is at an edge of the monitor window and turning on a local cursor controller when the cursor is at an edge of the local window.

15. The method of claim 8, wherein the local window is displayed in a monitoring system separate from the remote monitoring system, the method further comprising:
   displaying information of software operating on the remote monitored system in the monitor window; and
   displaying information of software operating on the monitoring system in the local window.

16. A monitoring apparatus, comprising:
   a window system to present a local window and a monitor window within the local window, the monitor window to display information of software operating on a remote system separate from the monitoring apparatus, and the local window to display information of software operating on the monitoring apparatus; and
   a synchronization system to receive cursor data from the remote system and to calibrate the cursor data to determine movement of a cursor in the monitor window.

17. The monitoring apparatus of claim 16, further comprising a local mouse controller to control movement of the cursor in the local window,
   wherein the synchronization system is adapted to receive the cursor data from a remote mouse controller in the remote system.

18. The monitoring apparatus of claim 17, wherein the local mouse controller is turned on and off in response to movement of the cursor between the monitor window and local window.

19. The monitoring apparatus of claim 16, wherein the synchronization system is adapted to calibrate the cursor data to enable smooth movement of the cursor when the cursor transitions between the monitor window and the local window.

20. A method for controlling a cursor comprising:
   determining a change in video data for a monitored frame;
   determining whether the change in video data corresponds to a cursor movement; and
   calibrating a cursor location based on the change in video data, wherein determining the change video dam for the monitored frame comprises the change in video data for the monitored frame using video buffer data, and wherein determining whether the change in video data corresponds to the cursor movement comprises determining whether the change in the video buffer data corresponds to the cursor movement.

21. A method for controlling a cursor comprising:
   determining a change in video data for a monitored frame;
   determining whether the change in video data corresponds to a cursor movement; and
   calibrating a cursor location based on the change in video data, further comprising receiving the video data from a video frame buffet, wherein determining whether the change in the video data corresponds to the cursor movement comprises determining whether the change in the video data from the video frame buffer corresponds to the cursor movement.

22. A method for controlling a cursor comprising:
   determining a change in video data for a monitored frame;
   determining whether the change in video data corresponds to a cursor movement; and calibrating a cursor location based on the change in video data, wherein determining the change in the video data comprises determining the change in the video data received from a video frame buffer over a Peripheral Component Interconnect (PCI) bus, and wherein determining whether the change in the video data corresponds to the cursor movement comprises determining whether the change in the video data from the video frame buffer over the PCI bus corresponds to the cursor movement.

* * * * *

UNITED STATES PATENT AND TRADEMARK OFFICE
CERTIFICATE OF CORRECTION

| | | |
|---|---|---|
| PATENT NO. | : 7,447,995 B2 | Page 1 of 1 |
| APPLICATION NO. | : 10/186114 | |
| DATED | : November 4, 2008 | |
| INVENTOR(S) | : Luis E. Luciani, Jr. et al. | |

It is certified that error appears in the above-identified patent and that said Letters Patent is hereby corrected as shown below:

In column 10, line 46, in Claim 20, delete "change video dam" and insert -- change in video data --, therefor.

In column 10, line 47, in Claim 20, after "comprises" insert -- determining --.

In column 10, line 59, in Claim 21, delete "buffet," and insert -- buffer, --, therefor.

Signed and Sealed this

Twelfth Day of May, 2009

JOHN DOLL
*Acting Director of the United States Patent and Trademark Office*